Dec. 15, 1942.　　　T. L. GATKE　　　2,305,073
SLIPPER BEARING
Filed Nov. 29, 1940　　　2 Sheets-Sheet 1
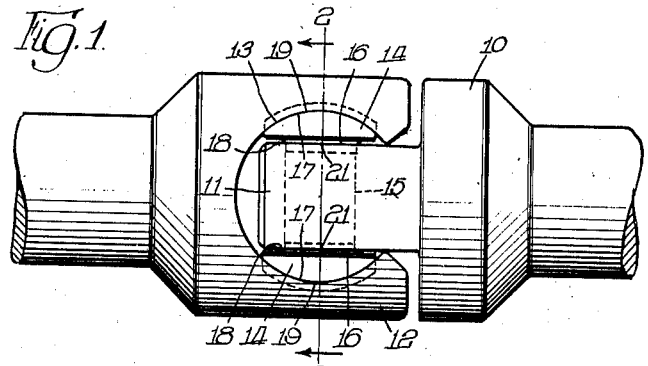
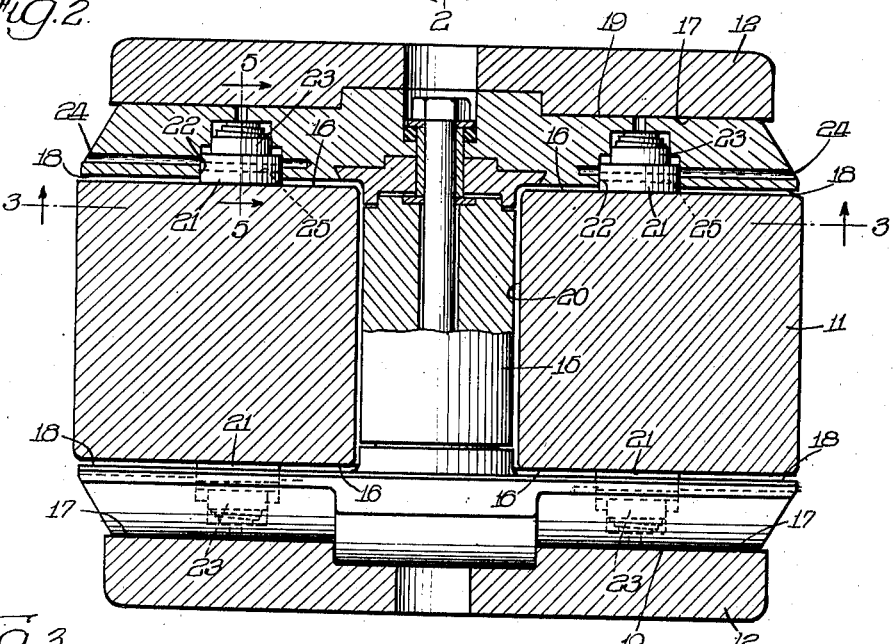
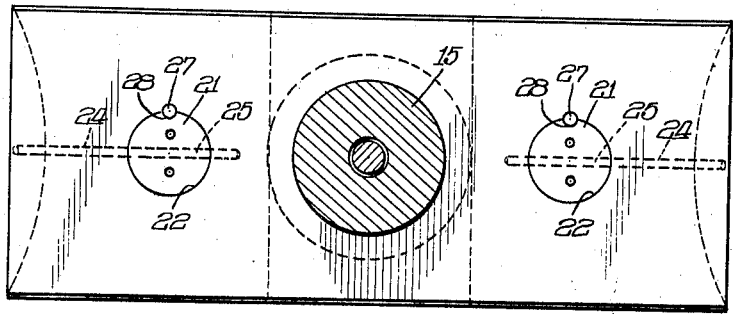
INVENTOR.
Thomas L. Gatke,
BY Cromwell, Greist & Warden
attys.

Dec. 15, 1942.                T. L. GATKE                 2,305,073
                             SLIPPER BEARING
                          Filed Nov. 29, 1940          2 Sheets-Sheet 2
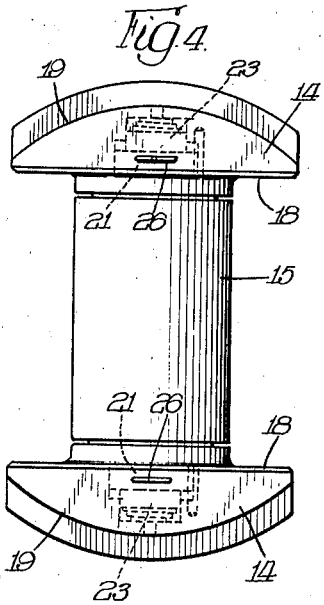
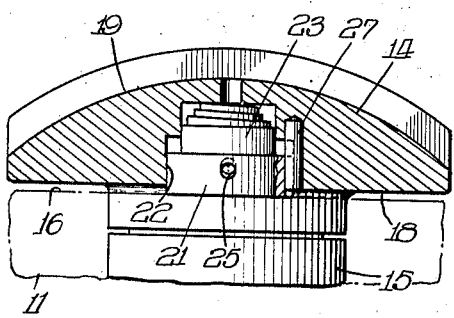 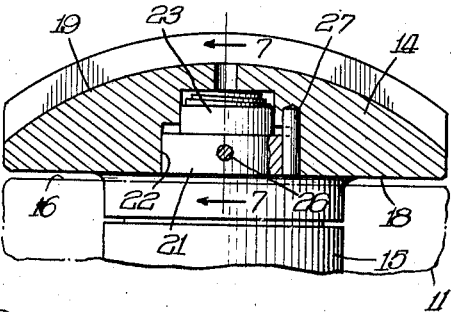
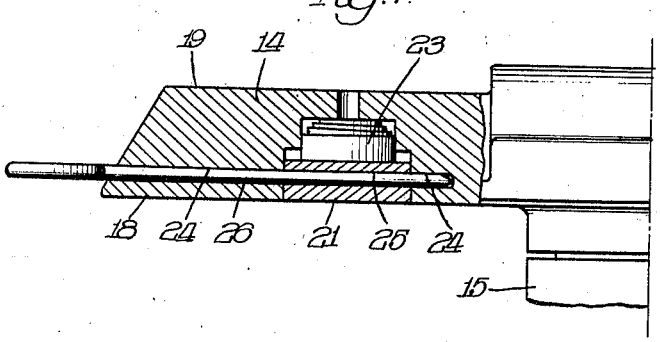
INVENTOR.
Thomas L Gatke,
BY Cromwell, Greist + Warden
                 Attys.

Patented Dec. 15, 1942

2,305,073

UNITED STATES PATENT OFFICE 2,305,073

SLIPPER BEARING

Thomas L. Gatke, Oak Park, Ill.

Application November 29, 1940, Serial No. 367,801

6 Claims. (Cl. 64—7)

This invention relates to slipper bearings of the type used in universal couplings.

In slipper bearings of this type the slapping which occurs between the slipper bearing and the male and female parts of the universal coupling when the drive is either started, stopped or reversed, frequently results in breakage of the slipper bearing. Molded composition slipper bearings are particularly susceptible to such breakage, but even all-metal slipper bearings are not immune from it. As the slipper bearing wears in service, and the clearance between the same and the parts of the universal coupling becomes larger by reason of such wear, the likelihood of breakage progressively increases until it is usually but a matter of time until the slipper bearing has to be replaced.

The object of the present invention is to provide an improved slipper bearing in which this slapping action is in large measure eliminated through inclusion in the dimetrically spaced segments of the slipper bearing of resiliently projected members which tend to press the segments outwardly away from each other into contact with the complementary portions of the female part of the universal coupling.

The improved slipper bearing is a self-contained unit which is capable of use with an ordinary universal coupling, without requiring any changes in or additions to the latter, but it can be used if desired with universal couplings of special design. The slipper bearing is of especially great value when used in heavy duty universal couplings, such as those employed in rolling mill drives, but it will be found to give excellent results when used in medium size and even small universal couplings.

While the foregoing statements are indicative in a general way of the nature of the invention, other more specific objects and advantages will be apparent to those skilled in the art upon a full understanding of the construction, arrangement and operation of the novel pressure members employed in the slipper bearing.

A preferred embodiment of the invention is presented herein for the purpose of exemplification, but it will of course be appreciated that the invention is susceptible of incorporation in other structurally modified forms coming equally within the scope of the appended claims.

In the accompanying drawings:

Fig. 1 is a side view of a universal coupling equipped with a slipper bearing constructed in accordance with the invention;

Fig. 2 is a vertical transverse section through the universal coupling, with the upper portion of the slipper bearing shown in section and the lower portion shown in elevation;

Fig. 3 is a bottom plan view of the upper portion of the slipper bearing, taken approximately on the line 3—3 of Fig. 2;

Fig. 4 is an end view of the slipper bearing, before insertion in the universal coupling, with the outwardly spring-pressed members locked in their retracted positions;

Fig. 5 is a vertical section through one end of the upper portion of the slipper bearing, taken on the line 5—5 of Fig. 2, with the socket portion of the universal coupling removed and the spade portion shown only in dot-dash lines;

Fig. 6 is similar to Fig. 5 but shows the pressure member through which the section is taken locked in its retracted position; and Fig. 7 is a section, taken on the line 7—7 of Fig. 6.

The improved slipper bearing is shown in Fig. 1 installed in a universal coupling 10. The universal coupling 10 is of ordinary construction and consists of a flat male part 11, which is commonly termed the spade, and a cylindrical female part 12, which is commonly termed the socket. The slipper bearing 13 consists of two cylindrical segments 14 and a center block 15. The segments 14 are disposed between the flat outer surfaces 16 of the spade 11 and the curved inner surfaces 17 of the socket 12. The inner surfaces 18 of the segments are flat and conform generally in shape and size to the outer surfaces 16 of the spade 11, while the outer surfaces 19 of the segments are curved and conform generally in shape and size to the inner surfaces 17 of the socket 12, all as usual in prior art slipper bearings of this type. Each of the segments 14 is shown as a one-piece member, but the present invention is not limited in its application to segments which are one-piece members. Each of the segments might be made in two or even more complementary parts and still incorporate the hereinafter described improvement. The center block 15, which is preferably cylindrical in shape, is located between the centers of the segments 14, in a slot 20 in the spade 11, and is coupled with the segments in such manner as to permit the latter to move outwardly away from each other into snug engagement with the surfaces 17 of the socket 12.

The segments 14 are provided, preferably along their center lines about midway between their centers and ends, with button-like members 21 which project from the flat inner surfaces 18 of the segments into engagement with the flat outer surfaces 16 of the spade. The members 21—which are shown as circular in shape, but which may be rectangular or of any other desired form—are slidably mounted in correspondingly shaped recesses 22 in the segments for movement toward and away from the spade 11 along lines which are radii of the socket 12. The recesses 22 are deeper than the members 21 and contain strong heavy duty coil springs 23, which springs are compressed under considerable pressure between the button-like members 21 and the bottoms of the recesses 22. The springs 23 are preferably of the conical spirally wound ribbon type, with each coil partially nested within the next to conserve space without sacrifice of strength.

The springs 23, by forcing the members 21 against the surfaces 16 of the spade 11, act to separate the diametrically spaced segments 14 from the spade as far as the clearance present will permit and act to press the segments into closely conforming engagement with the surfaces 17 of the socket 12. By maintaining this engagement the segments will not slap back and forth between the spade 11 and the socket 12, and breakage of the segments from this cause will be reduced to a minimum.

To facilitate insertion of the slipper bearing in the universal joint, holes 24 may be provided in the ends of the segments and other holes 25 may be provided in the members 21 in positions where they will line up with the holes 24 when the members 21 are forced back into the segments to points substantially flush with the inner surfaces 18 of the segments. The holes 24 and 25 are adapted to receive locking pins 26 (see Figs. 6 and 7), which pins can be withdrawn as soon as the slipper bearing has been inserted in the universal coupling. The members 21 can be held against turning in the recesses 22 by the addition of keys 27 in the segments which fit within semi-circular recesses 28 in the edges of the members.

The pressure members 21 tend to establish and maintain a parallel relationship at all times between the segments 14. They will compensate for clearances ranging from a few thousandths of an inch when the slipper bearing is new to a clearance many times as much after the slipper bearing has become worn. The members 21 are preferably of the same bearing composition as the segments 14, but may be of any other desired material. Instead of being solid button-like members projected by springs, they might be projected by rubber backing pads, or else might be made in their entireties of some resiliently compressible material and the springs or backing means eliminated.

I claim:

1. In a slipper bearing of the type comprising two cylindrical segments arranged in spaced relation with their outer faces substantially concentric and their inner faces generally parallel for insertion within the socket portion of a universal coupling at opposite sides of the spade portion of the coupling, resiliently yieldable members mounted in the inner flat faces of the segments of the slipper bearing, in projecting relation to such faces, for engagement with opposite faces of the spade portion of the universal coupling, whereby to press the cylindrical faces of the segments into contact with the opposed faces of the socket portion, and means carried by the segments for temporarily locking the resiliently yieldable members in retracted positions.

2. In a slipper bearing of the type comprising two cylindrical segments arranged in spaced relation with their outer faces substantially concentric and their inner faces generally parallel for insertion within the socket portion of a universal coupling at opposite sides of the spade portion of the coupling, spring receiving recesses formed in the inner flat faces of the segments, spring means in said recesses, and spring means compressing members in said recesses in projecting relation to the inner faces of said segments for engagement with opposite faces of the spade portion of the universal coupling, whereby to press the cylindrical faces of the segments into contact with the opposed faces of the socket portion.

3. In a slipper bearing of the type comprising two cylindrical segments arranged in spaced relation with their outer faces substantially concentric and their inner faces generally parallel, for insertion within the socket portion of a universal coupling at opposite sides of the spade portion of the coupling, resiliently yieldable members mounted in certain faces of the slipper bearing, in normally projecting but retractable relation thereto, for engagement with opposite faces of the universal coupling, said members being adapted to be forced back into the faces of the slipper bearing under substantial pressure, whereby to permit such faces to assume the pressure.

4. In a slipper bearing of the type comprising two cylindrical segments arranged in spaced relation with their outer faces substantially concentric and their inner faces generally parallel for insertion within the socket portion of a universal coupling at opposite sides of the spade portion of the coupling, resiliently yieldable members mounted in the inner flat faces of the segments of the slipper bearing, in projecting relation to such faces, for engagement with opposite faces of the spade portion of the universal coupling, whereby to press the cylindrical faces of the segments into contact with the opposed faces of the socket portion, said resiliently yieldable members being located at opposite sides of the center of the bearing adjacent the ends of the segments.

5. In a slipper bearing of the type comprising two cylindrical segments arranged in spaced relation with their outer faces substantially concentric and their inner faces generally parallel, for insertion within the socket portion of a universal coupling at opposite sides of the spade portion of the coupling, resiliently yieldable members mounted in recesses in certain faces of the slipper bearing, in normally projecting but retractable relation to said faces for engagement with opposed faces of the universal coupling.

6. In a slipper bearing of the type comprising two elongated cylindrical segments arranged in spaced relation with their outer faces substantially concentric and their inner faces generally parallel, for insertion within the socket portion of a universal coupling at opposite sides of the spade portion of the coupling, resiliently yieldable members mounted in recesses in the inner faces of the segments adjacent the ends of the latter, in normally projecting but retractable relation to said faces, for engagement with opposite faces of the spade portion adjacent the sides of the latter, whereby to press both ends of the cylindrical faces of the segments into contact with the opposed faces of the socket portion.

THOMAS L. GATKE.